United States Patent [19]

Barancyk et al.

[11] Patent Number: 5,976,701
[45] Date of Patent: *Nov. 2, 1999

[54] FLEXIBLE AMINOPLAST-CURABLE FILM-FORMING COMPOSITIONS AND COMPOSITE COATING

[75] Inventors: Steven V. Barancyk; Christopher A. Verardi, both of Pittsburgh; Gina M. Terrago, Wexford, all of Pa.

[73] Assignee: PPG Industries Ohio, Inc., Cleveland, Ohio

[ * ] Notice: This patent is subject to a terminal disclaimer.

[21] Appl. No.: 08/770,195

[22] Filed: Dec. 19, 1996

Related U.S. Application Data

[63] Continuation-in-part of application No. 08/586,053, Jan. 19, 1996, Pat. No. 5,798,145, which is a continuation-in-part of application No. 08/236,912, Apr. 19, 1994, abandoned.

[51] Int. Cl.⁶ ............. C08L 33/14; C08L 67/02; C08L 75/04
[52] U.S. Cl. .................. 428/423.1; 428/423.7; 428/424.2; 428/480; 428/482; 428/483; 428/500; 428/515; 428/524; 524/512; 524/539; 524/541; 525/131; 525/154; 525/157; 525/163; 525/406
[58] Field of Search .................. 525/406, 154, 525/157, 163, 131; 428/423.1, 423.7, 424.2, 480, 482, 483, 500, 515, 524; 524/512, 539, 541

[56] References Cited

U.S. PATENT DOCUMENTS

| | | |
|---|---|---|
| 3,366,613 | 1/1968 | Kelley ..................... 260/89.5 |
| 3,464,938 | 9/1969 | Nordstrom ................ 260/21 |
| 3,479,328 | 11/1969 | Nordstrom ................ 260/86.1 |
| 3,813,254 | 5/1974 | Makhlouf ................. 117/12 |
| 3,880,796 | 4/1975 | Christenson et al. ..... 260/33.6 |
| 3,919,154 | 11/1975 | Chang et al. ............. 260/29.4 |
| 3,953,644 | 4/1976 | Camelon et al. ......... 428/220 |
| 3,966,667 | 6/1976 | Sullivan et al. .......... 260/33.6 |
| 4,055,607 | 10/1977 | Sullivan et al. .......... 260/851 |
| 4,110,286 | 8/1978 | Vandegaer et al. ...... 260/29.2 |
| 4,147,679 | 4/1979 | Scriven et al. .......... 260/29.2 |
| 4,147,688 | 4/1979 | Makhlouf et al. ....... 260/33.6 |
| 4,154,891 | 5/1979 | Porter, Jr. et al. ....... 428/334 |
| 4,180,489 | 12/1979 | Andrew et al. .......... 428/402 |
| 4,180,619 | 12/1979 | Makhlouf et al. ....... 526/202 |
| 4,220,679 | 9/1980 | Backhouse ............... 427/401 |
| 4,279,833 | 7/1981 | Culbertson et al. ..... 260/464 |
| 4,308,184 | 12/1981 | Thoma et al. ........... 260/29.2 |
| 4,403,003 | 9/1983 | Backhouse ............... 427/402.1 |
| 4,411,951 | 10/1983 | Barsotti .................. 428/328 |
| 4,416,941 | 11/1983 | Barsotti .................. 428/328 |
| 4,425,450 | 1/1984 | Horvath ................... 523/334 |
| 4,455,331 | 6/1984 | Barsotti .................. 428/446 |
| 4,477,618 | 10/1984 | Singer et al. ............ 524/157 |
| 4,518,724 | 5/1985 | Kuwajima et al. ...... 523/501 |
| 4,520,167 | 5/1985 | Blank et al. ............. 525/131 |
| 4,540,766 | 9/1985 | Chang et al. ............ 528/45 |
| 4,543,276 | 9/1985 | Parekh .................... 427/388.3 |
| 4,558,075 | 12/1985 | Suss et al. ............... 523/216 |
| 4,569,966 | 2/1986 | Piccirilli et al. ......... 524/589 |
| 4,620,993 | 11/1986 | Suss et al. ............... 427/407.1 |
| 4,624,973 | 11/1986 | Kuwajima et al. ...... 523/221 |

(List continued on next page.)

FOREIGN PATENT DOCUMENTS

| | | |
|---|---|---|
| 0 211 359 A1 | 2/1987 | European Pat. Off. . |
| 0 234 881 A2 | 9/1987 | European Pat. Off. . |
| 0 257 848 | 3/1988 | European Pat. Off. . |
| 0 457 939 B1 | 11/1991 | European Pat. Off. . |
| 0 594 068 A1 | 4/1994 | European Pat. Off. . |
| 0 594 142 A1 | 4/1994 | European Pat. Off. . |
| 0 605 963 | 7/1994 | European Pat. Off. . |
| 0 636 660 A2 | 2/1995 | European Pat. Off. . |
| 0 697 400 | 2/1996 | European Pat. Off. . |
| 0 710 707 | 5/1996 | European Pat. Off. . |
| 49-18126 | 2/1974 | Japan . |
| 51-4124 | 1/1976 | Japan . |
| 6-184073 | 7/1994 | Japan . |
| 96-59950 | 3/1996 | Japan . |
| WO 87/00851 | 2/1987 | WIPO . |
| WO 94/10211 | 5/1994 | WIPO . |
| WO 94/10212 | 5/1994 | WIPO . |
| WO 94/10213 | 5/1994 | WIPO . |
| WO 95/29947 | 11/1995 | WIPO . |

*Primary Examiner*—Patricia A. Short
*Attorney, Agent, or Firm*—Kenneth J. Stachel; William J. Uhl; Krisanne Shideler

[57] ABSTRACT

A flexible, aminoplast-curable film-forming composition can serve as a transparent coating composition for a multi-component composite coating composition having the transparent coating on a pigmented or colored base coat. The film-forming composition comprises at least two polymeric components. One is a polyether polymer containing a plurality of terminal and/or pendant carbamate groups of the structure:

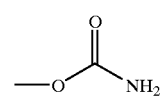

(Structure I)

Another is at least one additional carbamate functional polymer along with urethane oligomer or is a polyurethane polyol. The former include carbamate functional polyester, acrylic polymer, and polyurethane, where each contains a plurality of terminal and/or pendant carbamate groups of the Structure I depicted above. Also the urethane oligomers has a plurality of carbamate groups of Structure I that are pendant and/or terminal. The latter polyurethane polyol has a plurality of pendant and/or terminal hydroxyl groups and optionally can be used with the urethane polyol and/or any of the aforementioned carbamate functional polymers. Optionally an additional polymer that is present is an acrylic polymer containing a plurality of amide groups with or without a plurality of terminal and/or pendant carbamate groups of Structure I. Also with the presence of the amide functional acrylic polymer, silica can be employed. Additionally for crosslinking the film-forming composition contains an aminoplast crosslinking agent.

42 Claims, No Drawings

U.S. PATENT DOCUMENTS

| | | | |
|---|---|---|---|
| 4,677,168 | 6/1987 | Hoy et al. | 525/441 |
| 4,681,811 | 7/1987 | Simpson et al. | 428/413 |
| 4,764,430 | 8/1988 | Blackburn et al. | 428/413 |
| 4,829,120 | 5/1989 | Yabuto | 524/460 |
| 4,913,972 | 4/1990 | Grunewalder et al. | 428/425.5 |
| 4,916,187 | 4/1990 | Goel | 525/109 |
| 4,927,868 | 5/1990 | Schimmel et al. | 523/439 |
| 4,965,317 | 10/1990 | Kania et al. | 525/155 |
| 5,025,060 | 6/1991 | Yabuta et al. | 524/533 |
| 5,053,463 | 10/1991 | Inoue | 525/427 |
| 5,071,904 | 12/1991 | Martin et al. | 524/458 |
| 5,077,347 | 12/1991 | Yabuta et al. | 524/504 |
| 5,098,947 | 3/1992 | Metzger et al. | 524/507 |
| 5,124,433 | 6/1992 | Inoue | 528/272 |
| 5,130,405 | 7/1992 | Walker et al. | 528/78 |
| 5,196,485 | 3/1993 | McMonigal et al. | 525/327.3 |
| 5,300,328 | 4/1994 | Rehfuss | 427/388.3 |
| 5,300,537 | 4/1994 | Muller et al. | 523/115 |
| 5,336,566 | 8/1994 | Rehfuss | 428/524 |
| 5,356,669 | 10/1994 | Rehfuss et al. | 427/407.1 |
| 5,356,670 | 10/1994 | Briggs et al. | 427/410 |
| 5,373,069 | 12/1994 | Rehfuss et al. | 525/456 |
| 5,374,682 | 12/1994 | Gouda et al. | 525/185 |
| 5,384,367 | 1/1995 | Swarup et al. | 525/169 |
| 5,445,850 | 8/1995 | Das et al. | 427/407.1 |
| 5,451,656 | 9/1995 | Menovcik et al. | 528/288 |
| 5,474,811 | 12/1995 | Rehfuss et al. | 427/407.1 |
| 5,475,064 | 12/1995 | Menovcik et al. | 525/441 |
| 5,508,379 | 4/1996 | Menovcik et al. | 528/367 |
| 5,512,639 | 4/1996 | Rehfuss et al. | 525/456 |
| 5,532,061 | 7/1996 | Menovcik et al. | 428/423.1 |
| 5,552,497 | 9/1996 | Taylor et al. | 525/456 |
| 5,559,195 | 9/1996 | McGee et al. | 525/383 |
| 5,576,063 | 11/1996 | Briggs et al. | 427/386 |
| 5,593,785 | 1/1997 | Mayo et al. | 428/423.1 |
| 5,605,965 | 2/1997 | Rehfuss et al. | 525/100 |

FLEXIBLE AMINOPLAST-CURABLE FILM-FORMING COMPOSITIONS AND COMPOSITE COATING

CROSS-REFERENCE TO RELATED APPLICATIONS

This application is a continuation-in-part of U.S. patent application Ser. No. 08/586,053, filed on Jan. 16, 1996, now U.S. Pat. No. 5,798,145, which is a continuation-in-part of U.S. patent application Ser. No. 08/236,912, filed on Apr. 29, 1994, now abandoned. Reference is made to related U.S. patent application Ser. Nos. 08/605,420 filed Feb. 22, 1996, now U.S. Pat. No. 5,814,410; 08/494,905 filed on Jun. 26, 1995, now U.S. Pat. No. 5,593,785, 08/345,912 filed on Nov. 28, 1994, now U.S. Pat. No. 5,591,844, 08/329,915 filed on Oct. 27, 1994, now abandoned, 08/320,793 filed on Oct. 7, 1994, now pending, and 07/968,807 filed on Oct. 30, 1992, now pending.

FIELD OF THE INVENTION

The present invention relates to flexible, aminoplast-curable film-forming compositions and a multi-component composite coating composition comprising a pigmented or colored base coat and a transparent or clear coat.

BACKGROUND OF THE INVENTION

Plastic substrates are commonly used in automotive parts and accessories. Organic coating compositions are very often applied to these substrates for decorative and protective purposes. These plastic substrates are made of a variety of flexible thermosetting and thermoplastic materials such as polyethylene and polypropylene, thermoplastic urethane, polycarbonate, thermosetting sheet molding compound, reaction-injection molding compound, acrylonitrile-based materials, nylon and the like. The coating compositions that are used on these substrates must also be flexible so as to avoid cracking and adhesive failure under normal stresses and torsional forces to which the substrates may be subjected.

Color-plus-clear coating systems involving the application of a colored or pigmented base coat to a substrate followed by the application of a transparent or clear topcoat to the base coat have become very popular as original finishes for automobiles. The color-plus-clear systems have outstanding gloss and distinctness of image and the clear coat is particularly important for these properties.

Coating systems of the prior art which are known to be resistant to acid etch include acid-epoxy curable compositions such as those disclosed in U.S. Pat. No. 4,681,811 and compositions containing hydroxyl functional polymers reacted with isocyanates or polyisocyanates to form polyurethanes. The isocyanates are expensive and the toxicity of the isocyanates is an additional drawback.

Coating systems that employ hydroxy-aminoplast cure mechanisms are well known in coating technology and provide many excellent coating properties. They are inexpensive, durable and attractive. However, it is widely recognized that such coatings, particularly clear coats, have poor resistance to etching by acid. Acid etch resistance in coatings is becoming an increasingly desirable property, particularly for automotive coatings. Aminoplast cured coating systems of the prior art are not highly effective for providing protection against etching caused by acid rain. Additionally, such coating systems are often "high solids" coating compositions which tend to sag upon application to vertical surfaces and during baking. Such sagging adversely affects the appearance properties of the coating compositions.

It is desirable to provide a coating composition having improved appearance and performance properties, such as sag and acid etch resistance, utilizing inexpensive aminoplast technology. It is also desirable that such coating compositions be flexible enough for use on flexible automotive substrates and suitable for use in a color-plus-clear composite coating system.

SUMMARY OF THE INVENTION

In accordance with the present invention, a flexible, curable film-forming (i.e., coating) composition is provided comprising: (A) at least two polymeric components each having functional groups and (B) at least one aminoplast crosslinking agent.

One of the polymeric components is (Ai) a polyether polymer containing as functional groups a plurality of terminal and/or pendant carbamate groups of the structure:

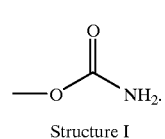

Structure I

One or both of the following polymeric components (Aii) can be present with the (Ai) component. An (Aii1) component is one or more polyesters, polyurethanes, and/or acrylic polymers, wherein each of these polymers can have functional groups that are a plurality of carbamate groups of Structure I that are pendant and/or terminal. This (Aii1) component is present in the film forming composition with urethane oligomer which has pendant and/or terminal carbamate groups of Structure I. Another polymeric component (Aii2) that can be present with the (Ai) component is polyurethane polyol having pendant and/or terminal hydroxyl groups and optionally carbamate groups of Structure I. Optionally the urethane oligomer as well as any of the other polymeric materials of the (Aii1) component can be present when the polyurethane polyol is present. Thereby mixtures of any two or more of these (Aii) components i.e., (Aii1) and (Aii2), can be employed.

optionally an additional polymeric component (Aiii) is present in the coating composition which is an amide functional acrylic copolymer that may be present optionally with colloidal silica.

Generally, the (A) polymeric components are present in the coating composition in effective film forming amounts and the (B) aminoplast is present in an effective crosslinking amount for the film forming polymers. The (Ai) polyether polymer is present in an amount of about 5 up to about 40 weight percent of the total resin solids of the coating composition. One or both of the (Aii) polymeric components is present along with the (Ai) polyether polymer to give an effective film forming amount of the polymer components in the coating composition. The (Aiii) amide functional acrylic copolymer is present with or without the silica in an effective rheology control amount for the coating composition.

A multi-component composite coating composition suitable for application over a plastic substrate is also provided. The composition comprises at least one pigmented or colored film-forming composition which serves as a base coat and at least one clear film-forming composition which serves as a transparent coat over the base coat. The transparent coat, or clear coat, is derived from the flexible, curable film-forming composition described above.

By "flexible", it is meant that the coating compositions are suitable for application over flexible, usually plastic, substrates such that they will pass standard flexibility testing. For example, in room temperature flex testing where a substrate is coated with the cured coating composition, the coating will pass by having less than 15 uninterrupted line cracks after bending over a mandrel, and this indicates that the coating will exhibit acceptable properties.

DETAILED DESCRIPTION

Unless stated to the contrary herein including the claims hereof, molecular weights are number average molecular weights for polymeric materials indicated as "Mn" and obtained by gel permeation chromatography using a polystyrene standard in an art-recognized manner. Also, as used herein and in the based on the relative amounts of the various ingredients used in making the specified polymer and is based on the solids of the specified polymer. The relative amounts are those that result in the theoretical weight in grams of the polymer produced from the ingredients and give a theoretical number of the particular functional group that is present in the resulting polymer. The theoretical polymer weight is divided by the theoretical number to give the equivalent weight. For example, carbamate equivalent weight is based on the equivalents of reactive pendant and/or terminal carbamate groups in the carbamate-containing polymer. Also, all ranges of amounts of components of the film forming and coating formulations, ratios of amounts, values for Mn and values for the temperatures of reaction are approximate from about the lower stated value to about the upper stated value unless stated to the contrary. Also, the term "oligomer" refers to lower molecular weight reaction products of the monomer reactants which do not have a substantial number and preferably only a minimal number, if any, repeating units.

The carbamate functional polyether polymer of component (Ai) may be prepared by reacting a polyether polyol with urea under reaction conditions typically employed by those skilled in the art when reacting polyols with urea. More preferably, the polyether polymer is prepared by a transcarbamoylation reaction described in detail below.

Examples of polyether polyols are polyalkylene ether polyols which include those having the following structural formula:

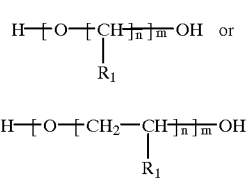

Structure II

Structure III where the substituent $R_1$ is hydrogen or lower alkyl containing from 1 to 5 carbon atoms including mixed substituents and n is typically from 2 to 6 and m is from 8 to 100 or higher. Note that the hydroxyl groups as shown in Structures II and III above are terminal to the molecules. Included are poly(oxytetramethylene) glycols, poly(oxytetraethylene) glycols, poly(oxy-1,2-propylene) glycols and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Preferred polyethers include those sold under the names TERATHANE and TERACOL, available from E. I. Du Pont de Nemours and Company, Inc. and POLYMEG, available from Q O Chemicals, Inc., a subsidiary of Great Lakes Chemical Corp.

Preferably, pendant and/or terminal carbamate functional groups may be incorporated into the polyethers by a "transcarbamoylation" reaction. Such a reaction may be performed at about 130 to about 170° C. and at pressures up to ambient pressure. In this reaction, a low molecular weight carbamate functional material derived from an alcohol or glycol ether is reacted with the hydroxyl groups of the polyether polyol, yielding a carbamate functional polyether and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic and aromatic alcohols such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is preferred.

The polyether polymer preferably has a number average molecular weight (Mn) of from 500 to 5000, more preferably from 1100 to 3200 and an equivalent weight of within the range of 140 to 2500, preferably approximately 500, based on equivalents of reactive pendant and/or terminal carbamate groups and the solids of the polyether polymer. The polyether polymer has on average up to two terminal and/or pendant carbamate groups per molecule. Preferably, the pendant and/or terminal carbamate groups only have the structure depicted in (I) above; i.e., they are not N-substituted (substituted at nitrogen, with organic groups or moieties) but rather have two hydrogen atoms.

The carbamate functional polyether polymer is typically present in the film-forming composition in amounts of 5 to 40, preferably 10 to 40 and most preferably 10 to 30 percent by weight based on the total weight of resin solids in the film-forming composition.

In addition to the polyether component with carbamate functionality, one or more other polymers (Aii) with either or both carbamate or hydroxyl functionality can be present in the composition.

These other polymers with carbamate functionality for the (Aii) component include linear or branched polyesters having carbamate functionality which may be prepared by the polyesterification of a polycarboxylic acid or anhydride thereof with polyols and/or an epoxide. The polyesters are generally prepared using techniques known to those skilled in the art. Usually, the polycarboxylic acids and polyols are aliphatic or aromatic dibasic acids and diols. Transesterification of polycarboxylic acid esters using conventional techniques is also possible.

The polyols which are usually employed in making the polyester (or the polyurethane polymer) include alkylene glycols, such as ethylene glycol and other diols such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol, trishydroxyethylisocyanurate and the like. Branched polyols, such as trimethylolpropane, are preferred in the preparation of the polyester.

The acid component of the polyester can be primarily monomeric carboxylic acids or anhydrides thereof having 2 to 18 carbon atoms per molecule. Among the acids which are useful are cycloaliphatic acids and anhydrides such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. Lower alkyl diacids, that is, acids having less than about 10 carbon atoms such as adipic acid, are preferred. The polyester may include minor amounts of monobasic acids such as benzoic acid, stearic acid, acetic acid and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate may be used. Cycloaliphatic acids and anhydrides are particularly preferred. Though not intending to be bound by any particular theory, it is believed that the use of polyester polymers derived from cycloaliphatic acids and anhydrides can improve the durability of the film-forming composition.

Pendant and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the polyethers or by reacting isocyanic acid with a hydroxyl functional polyester.

The polyester polymer typically has a Mn of from 500 to 2500, preferably about 800 to 2100 and a calculated carbamate equivalent weight within the range of 200 to 1500, preferably 200 to 500, based on equivalents of reactive pendant or terminal carbamate groups. This type of carbamate functional polyester polymer, when present in the film-forming composition, is used in amounts up to 60, preferably 20 to 55, percent by weight based on the total weight of resin solids in the film-forming composition.

Polymeric component (Aii) in the film-forming composition of the present invention may also include an acrylic polymer. The acrylic polymers are copolymers of one or more alkyl esters of acrylic acid or methacrylic acid and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate and 2-ethylhexyl acrylate. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. The acrylic polymers may contain hydroxyl functionality which can be incorporated into the acrylic polymer through the use of hydroxyl functional monomers such as hydroxyethyl acrylate, hydroxypropyl acrylate, hydroxyethyl methacrylate and hydroxypropyl methacrylate which may be copolymerized with the other acrylic monomers.

The acrylic polymer may be prepared by solution polymerization techniques in the presence of suitable initiators such as organic peroxides or azo compounds, for example benzoyl peroxide or N,N-azobis(isobutyronitrile). The polymerization may be carried out in an organic solution in which the monomers are soluble by techniques conventional in the art.

Carbamate functional groups may be incorporated into the acrylic polymer by copolymerizing the acrylic monomers with a carbamate functional vinyl monomer, for example, a carbamate functional alkyl ester of methacrylic acid. These carbamate functional alkyl esters are prepared by reacting, for example, a hydroxyalkyl carbamate with methacrylic anhydride. Other carbamate functional vinyl monomers are, for instance, the reaction product of a hydroxyalkyl (meth) acrylate such as hydroxyethyl methacrylate, a diisocyanate such as isophorone diisocyanate and a carbamate functional alcohol such as hydroxypropyl carbamate. Such monomers are disclosed in U.S. Pat. No. 5,098,947 at columns 3–8. Still, other carbamate functional vinyl monomers may be used, such as the reaction product of isocyanic acid (HNCO) with a hydroxyl functional acrylic or methacrylic monomer such as hydroxyethyl acrylate and those described in U.S. Pat. No. 3,479,328 at columns 1–7. Carbamate groups can also be incorporated into the acrylic polymer by reacting a hydroxyl functional acrylic polymer with a low molecular weight carbamate functional material via a transcarbamoylation process similar to the one described above in connection with the incorporation of carbamate groups into the polyethers.

The acrylic polymer typically has a Mn of from 900 to 13,000, preferably from 1000 to 5000 and a calculated carbamate equivalent weight less than 5000, preferably within the range of 140 to 2500, based on equivalents of reactive carbamate groups. This type of carbamate functional acrylic polymer, when present in the film-forming composition, is used in amounts up to 50 and preferably up to 20, most preferably about 10 to about 20 percent by weight based on the total weight of resin solids in the film-forming composition.

Also the polymeric component (Aii) can be polyurethane polymer with pendant and/or terminal carbamate functionality or groups. Among the polyurethanes which can be used are polymeric reaction products of polyols, which are prepared by reacting the polyester polyols or acrylic polyols such as those mentioned above, with a polyisocyanate such that the OH/NCO equivalent ratio is greater than 1:1 so that free hydroxyl groups are present in the product. Such reactions employ typical conditions for urethane formation, for example, temperatures of about 60 to about 90° C. and up to ambient pressure, as known to those skilled in the art.

The organic polyisocyanate which is used to prepare the polyurethane polymer can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Pendant carbamate functional groups may be incorporated into the polyurethane by reacting a polyisocyanate with a polyester polyol containing the pendant carbamate groups. Alternatively, the pendant carbamate functional groups may be incorporated into the polyurethane by reacting a polyisocyanate with a polyester polyol and a hydroxyalkyl carbamate or isocyanic acid as separate reactants. Pendant carbamate functional groups may also be incorporated into the polyurethane by reacting a hydroxyl functional polyurethane with a low molecular weight carbamate functional material via a transcarbamoylation process similar to the one described above in connection with the incorporation of carbamate groups into the polyethers.

The polyurethanes typically have a Mn of from about 300 to 3100, preferably from about 300 to 2500, and a carbamate equivalent weight within the range of 140 to 2600, based on equivalents of reactive pendant or terminal carbamate groups. The polyurethane polymer, when present in the film-forming composition, is used in amounts up to 55, preferably up to 20 percent by weight based on weight of resin solids in the film-forming composition.

In addition to or as a substitute for the other polymeric components (Aii), a polyurethane polyol with a plurality of pendant and/or terminal hydroxyl functionality can be employed in the coating formulation. Polyurethane polyols can be prepared by reacting polyol with polyisocyanate as described above and used as is without the addition of carbamate functionality. The organic polyisocyanate reacted with polyols to form the polyurethane polyol can be the same ones as those described above for the polyurethane polymer. As for the polyol reactants, these can include those described above in the preparation of the polyester and may also include polyester polyols. The polyurethane polyol generally can have a hydroxyl equivalent weight within the range of 250 to 500, based on equivalents of reactive hydroxyl groups.

A particularly preferred polyurethane polyol is the reaction product of butyl ethyl propane diol and the isocyanurate of hexamethylene diisocyanate, available as SETALUX EPC/90/2/48 from Industrial Colors and Chemicals Limited, manufactured by AKZO Nobel Resins. This type of hydroxyl functional polyurethane is also described in U.S. Pat. No. 5,130,405.

The urethane oligomer present with any of the polymers of the (Aii) component has a plurality of carbamate groups of Structure I above that are pendant and/or terminal carbamate groups. The preparation of the urethane oligomer is similar to that of the polyurethane polymer with similar reactants but without achieving as high a degree of polymerization. Particularly suitable carbamate functional urethane oligomers may be prepared by reacting a hydroxyalkyl carbamate, such as the reaction product of ammonia and ethylene carbonate or propylene carbonate, with a polyisocyanate. Useful organic polyisocyanate include aliphatic and/or aromatic polyisocyanate like any of those described above and diisocyanates or a combination of diisocyanates. Also some higher polyisocyanates can be utilized. Carbamate functionality also can be provided to the oligomer in a manner similar to that for the polyurethane. Among the useful urethane oligomers are the reaction products of diisocyanate and hydroxyalkyl carbamates, wherein the alkyl group generally can have from 2 to 10 carbons. An example is the reaction product of isophorone diisocyanate and hydroxypropyl carbamate and/or hydroxyethylcarbamate. A suitable carbamate functional urethane oligomer is the reaction product of hydroxypropyl carbamate and isophorone diisocyanate as known to those skilled in the art as shown in U.S. Pat. No. 5,512,639. Such reactions employ typical conditions for urethane formation, as known to those skilled in the art.

Generally, the urethane oligomer can have a Mn like the polyurethane of from 300 to 3100, preferably from 300 to 2500, but the oligomer typically has a molecular weight in the lower to middle portion of the range. An exception is when higher molecular weight monomers are used as reactants in which case the molecular weight can be higher. Also, the calculated carbamate equivalent weight of the urethane oligomer and the amount of the urethane oligomer in the coating composition is similar to that for the aforedescribed polyurethanes.

The urethane oligomer can be used in amounts preferably of 10 to 40 percent by weight based on the total weight of resin solids in the film-forming composition. Though not intending to be bound by any particular theory, it is believed that the use of polyurethanes and/or urethane oligomer improves the water spotting resistance of the film-forming composition.

The optional but preferred acrylic polymer containing a plurality of amide groups as polymeric component (Aiii) of the film-forming composition, optionally, may have a plurality of terminal and/or pendant carbamate groups of Structure I. In other words the acrylic polymer may contain amide functionality alone or both amide and carbamate functionality on the same molecules. Suitable acrylic polymers are copolymers of one or more alkyl esters of acrylic acid or methacrylic acid and, optionally, one or more other polymerizable ethylenically unsaturated monomers, such as those described above.

Amide functionality may be introduced into the polymer by reacting ethylenically unsaturated amide functional monomers with the other acrylic monomers. Suitable amide functional monomers include, inter alia, acrylamide, methacrylamide, N-isopropylacrylamide, and N-tert-butylacrylamide. Methacrylamide is preferred. The copolymers can be formed as random or graft copolymers where the latter is formed by polymerizing a second monomer in the presence of an acrylamide homopolymer or a dispersion of the homopolymer. The polymerization reactions can be free-radical reactions with free radical catalysts as described above for acrylic polymerization or by other methods known to those skilled in the art.

Carbamate functionality may be introduced into the polymer as described above in carbamylation of acrylic polymers. For instance, the copolymer of the acrylamide or methacrylamide is made with hydroxy functional acrylate like hydroxyethylmethacrylate, hydroxypropylmethacrylate and the like and transcarbamylation is conducted to give the copolymer carbamate functionality.

The amide functional acrylic polymer typically has a Mn of from 900 to 13,000, preferably from 1000 to 5000, and has an amide equivalent weight within the range of 170 to 1700, based on equivalents of reactive amide groups. Such amide functional acrylic polymer can be used in amounts up to about 30, preferably about 10 to about 15 percent by weight based on the total weight of resin solids in the film-forming composition. Not intending to be bound by any particular theory, it is believed, that the amide functional acrylic polymer serves to control the rheology of the film-forming composition during application to a substrate.

In addition, the film-forming composition of the present invention further can have (particularly in combination with the amide functional acrylic polymer) up to about 3 percent by weight, preferably about 1 to about 2 percent by weight of an amorphous hydrophilically modified silica. The percentages by weight are based upon total resin solids in the coating composition. Suitable modified silicas are colloidal silica including fumed silicas which have been partially or totally modified on their surfaces through the silanization of hydroxyl groups on the silica particle. Examples of suitable silicas include AEROSIL R972, AEROSIL R812 and AEROSIL R805, all commercially available from Degussa Corporation. A particularly preferred silica is a hydrophilic fumed silica, available from Degussa Corporation as AEROSIL 300 silica.

The silica may be added to the film-forming composition neat or may be dispersed in one of the component polymers by a grinding process. This latter approach is that which is known to those skilled in the art of incorporating pigments into coating formulations using conventional equipment such as high-speed blade mixers, ball mills or sand mills. If the silica is dispersed in a polymer such as the amide functional acrylic copolymer above, the dispersion may be added to the coating composition at any time during formulation as a rheology control additive mixture.

The coating composition also includes an aminoplast crosslinking agent (B) containing methylol groups, methylol ether groups, or mixtures thereof like those that are reactive with pendant and/or terminal carbamate and/or hydroxyl groups. Aminoplasts are obtained from the reaction of formaldehyde with an amine or amide or carbamate. The latter is described in U.S. Pat. No. 3,479,328 (Nordstrom). The most common amines or amides are melamine, urea or benzoguanamine and are preferred. However, aminoplast condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde and benzaldehyde may be used.

The aminoplast contains methylol groups and preferably at least a portion of these groups are etherified with an alcohol to modify the cure response. Any monohydric alcohol may be employed for this purpose such as those containing 1 to 6 carbon atoms including methanol, ethanol, butanol, isobutanol, cyclohexanol and hexanol and blends thereof. Also, fully alkylated aminoplast crosslinking agents can be used which refer to those where the alkylol groups associated with the reaction product of an aldehyde with an amine and/or an amide have been etherified to an extent that the alkoxy groups constitute at least eighty (80) percent by weight of the functional groups of the aminoplast. One example of a blend that can be used includes methanol and n-butanol which results in a melamine-formaldehyde condensate that is, on average, 75 percent methylated and 25 percent butylated.

Preferably, the aminoplasts which are used are melamine-, urea-, or benzoguanamine-formaldehyde condensates etherified with an alcohol containing from one to four carbon atoms. The aminoplast is present in amounts of about 15 to about 50, preferably about 20 to about 35 percent by weight based on the total weight of resin solids in the film-forming composition.

Usually, the film-forming composition will also preferably contain catalysts to accelerate the cure of the aminoplast and carbamate groups and any hydroxyl groups. Examples of suitable catalysts are acidic materials and include acid phosphates and sulfonic acid or a substituted sulfonic acid such as dodecylbenzene sulfonic acid or para-toluene sulfonic acid. The catalyst is usually present in an amount of about 0.5 to about 5.0 percent by weight, preferably about 1 to about 2 percent by weight, based on the total weight of resin solids. Optional ingredients such as, for example, plasticizers, flow controllers, anti-oxidants, UV light absorbers and similar additives conventional in the art may be included in the composition. These ingredients are typically present at up to about 25 percent by weight based on the total weight of resin solids in the film-forming composition.

Preferably for the coating composition, the equivalent ratio of the pendant and/or terminal carbamate groups in the polymers to methylol or methylol ether groups in the aminoplast is preferably from about 0.5 to about 2:1 and is sufficient to form a crosslinked film. The resultant crosslinked coating contains a substantial number of urethane crosslinks which arise from reaction of the terminal or pendant carbamate groups with the aminoplast, thereby providing a high level of acid etch resistance. By "high level", it is meant that the resistance of the coating composition to etching by acid rain is significantly improved compared to conventional hydroxyl-aminoplast cured coating compositions.

The film-forming composition of the present invention can have suitable solvents which act as solvents for one or more of the polymeric components and the crosslinking agent as is known to those skilled in the art to give the composition an effective solids level for application to substrates. Such solvents would not be necessary when the film forming composition is in the form of a powder coating or a dispersion. Nonexclusive examples of some of these organic solvents are indicated in the Examples, infra. Others include water and polar aliphatic solvents or polar aromatic solvents such as acetates; esters; ketones; and aprotic amides and amines. Suitable solvents include: ethylene glycol butyl ether-acetate, propylene glycol monomethyl ether acetate, m-amyl acetate, methyl ethyl ketone, methyl isobutyl ketone, xylene or blends of aromatic hydrocarbons. For instance for sprayable compositions, the solvents are suitable to give an effective sprayable solvent borne coating composition with a solids level of 35 to 60 weight percent of the composition. In the coating composition of the present invention, the weight percentages of the various polymeric components discussed above are based on total resin solids of the coating formulation so that with the various polymeric components present in the coating, the total weight percentage for resin solids is preferably 100 percent.

The film-forming composition of the present invention is preferably used as the clear coat layer in a multi-component composite coating composition such as a "color-plus-clear" coating system, which includes at least one pigmented or colored base coat and at least one clear coat or topcoat. The meaning of the term "topcoat" as used herein only indicates that the clear coat is over top of the base coat and not necessarily, although it preferably is, the uppermost or outermost coating of the multi-component coating system. Additionally the coating composition of the present invention can contain a pigment and have utility as a monocoat type of topcoat over primer coats on substrates.

The film-forming composition of the base coat in the color-plus-clear system can be any of the compositions useful in coatings applications, particularly automotive applications. The film-forming composition of the base coat generally comprises a resinous binder and a pigment to act as the colorant. Particularly, useful resinous binders are acrylic polymers, polyesters, including alkyds and polyurethanes. The base coat compositions may be solventborne or waterborne. Waterborne base coats in color-plus-clear compositions are disclosed in U.S. Pat. No. 4,403,003 and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat also contains pigments to give it color. Suitable metallic pigments include, in particular, aluminum flake, copper bronze flake and metal oxide coated mica. The base coating compositions of the present invention may contain non-metallic color pigments conventionally used in surface coatings including inorganic pigments such as titanium dioxide, iron oxide, chromium oxide, lead chromate and carbon black, and organic pigments such as phthalocyanine blue and phthalocyanine green. In general, the pigment is incorporated into the coating composition in amounts of 1 to 80 percent by weight based on the total weight of coating solids. The metallic pigment is employed in amounts of 0.5 to 25 percent by weight based on the total weight of coating solids.

If desired, the base coat composition, as well as the clear coat composition, may contain additional materials well known in the art of formulated surface coatings. These would include surfactants, flow control agents, thixotropic agents, fillers, anti-gassing agents, organic cosolvents, catalysts and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

Although the coatings of the present invention may be applied to various substrates including wood, metals and glass, they are particularly effective in applications over flexible plastic substrates that are found on motor vehicles. By "plastic", it is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon and the like.

During application of the base coat composition to the substrate, a film of the base coat is formed on the substrate. Typically, the base coat thickness will be about 0.01 to about 5 mils (0.254 to 127 microns), preferably about 0.1 to about 2 mils (2.54 to 50.8 microns) in thickness.

After application of the base coat to the substrate, a film is formed on the surface of the substrate by driving solvent, i.e., organic solvent or water, out of the base coat film by heating or by an air-drying period. Preferably, the heating will only be for a short period of time, sufficient to ensure that the clear coat can be applied to the base coat without the former dissolving the base coat composition. Suitable drying conditions will depend on the particular base coat composition and on the ambient humidity with certain waterborne compositions, but in general a drying time of from 1 to 5 minutes at a temperature of about 80 to about 250° F. (20 to 121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed, that is, exposed to ambient conditions for 1 to 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from about 160 to about 350° F. (71 to 177° C.) but if needed, lower or higher temperatures may be used as necessary to activate crosslinking mechanisms. The thickness of the clear coat is usually from about 0.5 to about 5 mils (12.7 to 127 microns), preferably about 1.2 to about 3 mils (30.5 to 76.2 microns).

The invention will further be described by reference to the following examples. Unless otherwise indicated, all parts are by weight. Examples A through J illustrate the preparation of various carbamate functional polymers and oligomers. Example K illustrates the preparation of an amide functional acrylic polymer.

EXAMPLE A

A carbamate functional polyether was prepared from the following ingredients:

| Ingredient | Weight in grams |
| --- | --- |
| TERATHANE 650[1] | 1300.00 |
| Propylene glycol methyl ether (DOWANOL PM) carbamate[2] | 526.3 |
| butyl stannoic acid (BSA) | 1.83 |
| triphenylphosphite (TPP) | 1.83 |

[1]Polytetramethylene glycol, available from E. I. Du Pont de Nemours and Company, Inc., Delaware, having a number average molecular weight of 600 to 700 and an OH value of 160 to 187.
[2]Reaction product of propylene glycol methyl ether (available from Dow Chemical Co. as DOWANOL PM) and urea, 96.0 percent in DOWANOL PM A suitable reactor equipped for vacuum distillation was charged with the above ingredients and heated to 100° C. under a $N_2$ blanket. The reaction mixture was sparged with $N_2$ for 20 minutes at this temperature. Upon completion of sparging, the temperature of the reaction mixture was raised to 140° C. Vacuum was applied to the system until DOWANOL PM began to distill from the reaction mixture. The vacuum on the system was gradually increased as the reaction progressed to a maximum vacuum of 1 millimeter (mm) to maintain a steady distillation of DOWANOL PM. The resultant reaction mixture was a soft, white, waxy opaque material with a OH value of 12.9, a total Nitrogen content of 3.67 percent and a Mn of 1192. The calculated carbamate equivalent weight was 386.

EXAMPLE B

A carbamate functional polyether was prepared from the following ingredients:

| Ingredient | Weight in grams |
| --- | --- |
| POLYMEG 1000[1] | 2000.00 |
| DOWANOL PM carbamate | 524.4 |
| butyl stannoic acid | 2.51 |
| triphenylphosphite | 2.51 |

[1]Polytetramethylene glycol having a number average molecular weight of about 1000, available from Q O Chemicals, Inc., a subsidiary of Great Lakes Chemical Corp.

A suitable reactor equipped for vacuum distillation was charged with the above ingredients and heated to 100° C. The reaction mixture was sparged with $N_2$ for 20 minutes at this temperature. Upon completion of sparging, the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm in order to maintain a steady distillation of DOWANOL PM. The resultant reaction mixture was a soft, white, waxy opaque material with an OH value of 15.4, a total Nitrogen content of 3.67 percent and a Mn of 1748. The calculated carbamate equivalent weight was 571.

EXAMPLE C

A carbamate functional polyether was prepared from the following ingredients:

| Ingredient | Weight in grams |
| --- | --- |
| TERATHANE 2000[1] | 2000.00 |
| DOWANOL PM carbamate | 263.15 |
| butyl stannoic acid | 2.27 |
| triphenylphosphite | 2.27 |

[1]Polytetramethylene glycol, available from E. I. Du Pont de Nemours and Company, Inc., having a number average molecular weight of 1900 to 2100 and an OH value of 53 to 59.

A suitable reactor equipped for vacuum distillation was charged with the above ingredients and heated to 100° C. The reaction mixture was sparged with $N_2$ for 20 minutes at this temperature. Upon completion of sparging, the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm to maintain a steady distillation of DOWANOL PM. The resultant reaction mixture was a soft, slightly yellow, waxy opaque material with an OH value of 5.4, a total nitrogen content of 1.3 percent and a Mn of 3127. The calculated carbamate equivalent weight was 1095.

EXAMPLE D

A carbamate functional linear polyester urethane was prepared from the following ingredients:

| Ingredient | Weight in grams |
| --- | --- |
| polyester urethane polyol[1] | 2348.4 |
| triphenylphosphite | 2.35 |
| DOWANOL PM carbamate | 744.66 |
| butyl stannoic acid | 3.10 |
| triphenylphosphite | 3.10 |

[1]Reaction product of neopentyl glycol, hexahydrophthalic anhydride, adipic acid and 4,4'-methylenebis (cyclohexyl isocyanate) (available as DESMODUR W from Miles, Inc. or Bayer U.S.A., Pittsburgh, Pennsylvania) in a 1.00:0.50:0.22:0.002 mole ratio, having a hydroxyl value of 159.3 based on weight of resin solids, 90.0 percent in DOWANOL PM acetate.

The first two ingredients were charged to a suitable reactor equipped for vacuum distillation and heated to 140° C. under a $N_2$ blanket. Vacuum was applied to the system and DOWANOL PM acetate solvent was removed from the pot under reduced pressure. The reaction was cooled to 80° C. and the remaining ingredients were added to the reactor. The reaction mixture was heated to 100° C. and sparged with nitrogen for 20 minutes at this temperature. Upon completion of sparging, the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm to maintain a steady distillation of DOWANOL PM. After the reaction was complete, the reaction product was thinned with 661 grams (g) DOWANOL PM acetate to a measured solids of 84.0 percent and a viscosity of Z5 on the Gardner-Holt scale. The thinned reaction product had an OH value of 18.5 based on resin solids, a Mn of 873 and a weight average molecular weight of 1292. The calculated carbamate equivalent weight was 479.

EXAMPLE E

A branched polyester derived from a cycloaliphatic anhydride was prepared from the following ingredients:

| Ingredient | Weight in grams |
| --- | --- |
| trimethylolpropane | 900.4 |
| methylhexahydrophthalic anhydride | 3326.4 |
| ESTERDIOL 204[1] | 4124.8 |
| TPP | 8.34 |
| BSA | 12.54 |

[1]2,2-dimethyl-3-hydroxypropyl 2,2-dimethyl-3-hydroxypropanoate, available from Union Carbide Chemicals and Plastics Co., Inc., Danbury, Connecticut.

The above ingredients were charged to a suitable reactor equipped with a $N_2$ sparge, a glycol recovery column and a distillation head, heated to 80° C. and degassed three times by pulling a vacuum on the reactor and backfilling with $N_2$. The reaction mixture was then heated to a temperature between 200° C. and 210° C. with removal of water. As water was removed from the reaction, the acid value dropped to 2.8. The final product was a transparent material with a viscosity >Z6 on the Gardner-Holt viscosity scale, a measured solids of 96.3 percent, an OH value of 125.4 based on resin solids, a number average molecular weight of 1254 and a weight average molecular weight of 2794.

EXAMPLE F

A carbamate functional branched polyester derived from a cycloaliphatic anhydride was prepared from the following ingredients:

| Ingredient | Weight in grams |
| --- | --- |
| polyester from Example E | 3050.4 |
| DOWANOL PM carbamate | 1034.03 |
| TPP | 4.07 |
| BSA | 4.07 |

A reactor equipped for vacuum distillation was charged with the above ingredients and heated to 95° C. The reaction mixture was degassed three times at this temperature by evacuating the reactor and backfilling with $N_2$ each time. Upon completion of degassing, the temperature of the reaction mixture was raised to 140° C. Vacuum was applied to the system until DOWANOL PM began to distill from the reaction mixture. The vacuum on the system was gradually reduced as the reaction progressed to a maximum vacuum of 1 mm in order to maintain a steady distillation of DOWANOL PM. The resultant reaction mixture was a viscous, resinous material with an OH value of 8.8 and a measured solids of 98.7. After dilution with 1000 g n-propanol, the reaction mixture has a measured solids of 76.4 percent, a viscosity of $Z1^+$ on the Gardner-Holt scale. The carbamate functional branched polyester had a Mn weight of 1349, a weight average molecular weight of 3131 and a total Nitrogen (N) content of 2.51 percent. The calculated carbamate equivalent weight was 386.

EXAMPLE G

A carbamate functional acrylic polymer was prepared from the following ingredients:

| Ingredient | Weight in grams |
| --- | --- |
| acrylic polymer[1] | 2239.9 |
| DOWANOL PM carbamate | 903.9 |
| TPP | 3.11 |
| BSA | 3.11 |

[1]Reaction product of hydroxypropyl acrylate, styrene, butyl acrylate, butyl methacrylate, methyl methacrylate and methyl styrene dimer in a 40:20:19:18.5:0.5:2 weight ratio, approximately 10,000 weight average molecular weight, stripped to 100 percent theory solids.

A reactor equipped for vacuum distillation was charged with the above ingredients and heated to 100° C. The reaction mixture was sparged with $N_2$ for 20 minutes at this temperature. Upon completion of sparging, the temperature of the reaction mixture was raised to 140° C. Vacuum was applied to the system until DOWANOL PM began to distill from the reaction mixture. The vacuum on the system was gradually reduced as the reaction progressed to a maximum vacuum of 1 mm in order to maintain a steady distillation of DOWANOL PM. After the reaction was complete, the reaction mixture was thinned with a 1:1 blend of butyl acetate and AROMATIC 100 (also called SOLVESSO 100, available from Exxon Chemical Co., Houston, Tex.) to a theoretical (calculated) solids of 70 percent and a final viscosity of >Z6 on the Gardner-Holt scale. The carbamate functional acrylic polymer had a total N content of 2.93 percent, a Mn weight of 4063 and a weight average molecular weight of 18,884. The calculated carbamate equivalent weight was 386.

EXAMPLE H

A branched carbamate functional polyester similar to the polyester of Example F but based on a linear diacid instead of a cycloaliphatic anhydride was prepared from the following ingredients:

| Ingredients | Weight in grams |
| --- | --- |
| trimethylolpropane | 188.08 |
| sebacic acid | 836.95 |
| 2,2-dimethyl-3-hydroxypropyl-2,2-dimethyl-3-hydroxypropyl propionate | 861.70 |
| butyl stannoic acid | 3.78 |
| triphenylphosphite | 1.89 |
| butyl stannoic acid | 2.48 |
| triphenylphosphite | 2.48 |
| DOWANOL PM carbamate (37% solution in DOWANOL PM) | 1573.3 |
| DOWANOL PM | 643.5 |

The first five ingredients were charged to a suitable reactor equipped with a nitrogen sparge and a glycol recovery column and heated to 210° C. As water was removed from the reaction, the acid value of the reaction mixture dropped to 3.1. The intermediate resin was then cooled to 140° C. Butyl stannoic acid and triphenylphosphite were added to the reactor. DOWANOL PM carbamate in DOWANOL PM solution was added to the reactor over a period of three hours. During the addition, DOWANOL PM was removed from the reactor under reduced pressure. The reaction was continued until the DOWANOL PM evolution stopped. Before dilution, the material had a residual OH value of 18.1. The resin was diluted with DOWANOL PM. After dilution, the resin had a measured solids content of 75.0 percent, a Gardner-Holt viscosity of V-, a Mn of 1688 and a weight average molecular weight of 6182 as determined by gel permeation chromatography using a polystyrene standard. The calculated carbamate equivalent weight was 440.

EXAMPLE I

A branched carbamate functional polyester derived from a cycloaliphatic anhydride was prepared from the following ingredients, listed in order of addition:

| Ingredient | Weight in parts |
| --- | --- |
| Charge 1 | |
| 2,2-dimethyl-3-hydroxypropyl-2,2-dimethyl-3-hydroxypropyl propionate | 158.2 |
| deionized $H_2O$ | 7.0 |
| trimethylolpropane | 69.4 |
| butyl stannoic acid | 0.6 |
| triphenylphosphite | 0.4 |
| deionized $H_2O$ | 3.0 |
| methylhexahydrophthalic anhydride | 170.4 |
| Charge 2 | |
| DOWANOL PM | 3.0 |
| butyl stannoic acid | 0.5 |
| triphenylphosphite | 0.5 |
| DOWANOL PM | 2.0 |
| DOWANOL PM carbamate (37% solution in DOWANOL PM) | 451.0 |
| DOWANOL PM | 5.0 |
| DOWANOL PM | 145.0 |

The first ingredient was charged to a suitable reactor equipped with a glycol recovery column. Deionized $H_2O$ was added to the reactor as a rinse for the first ingredient. Trimethylolpropane, butyl stannoic acid and triphenylphosphite were then added to the reactor, followed by a deionized water rinse. Methylhexahydrophthalic anhydride was then added to the reactor. The reaction mixture was then heated to 77° C. and sparged with nitrogen for 20 minutes. The reaction mixture was heated to 210° C. and water was removed from the reactor with the nitrogen sparge. The reaction was held to an acid value of 10.4 and the batch cooled to 140° C. The intermediate resin had a hydroxyl value of 164.5. As a second charge, DOWANOL PM and butyl stannoic acid were added to the reactor as a slurry, followed by addition of triphenylphosphite and a DOWANOL PM rinse. DOWANOL PM carbamate in DOWANOL PM solution was added to the reactor over a period of four hours. During the addition, DOWANOL PM was removed from the reactor under reduced pressure. Upon completion of the addition, a DOWANOL PM rinse was added to the reactor. The reaction was continued until DOWANOL PM evolution stopped. The resin prior to dilution had a residual hydroxyl value of 17.8 and an acid value of 7.9. After dilution, the resin had a measured solids content of 69.3 percent, a Gardner-Holt viscosity of Z3–, a Mn of 1197 and a weight average molecular weight of 3340 as determined by gel permeation chromatography using a polystyrene standard. The calculated carbamate equivalent weight was 346.

EXAMPLE J

A carbamate functional urethane oligomer was prepared from the following ingredients:

| Ingredient | Weight in grams |
|---|---|
| hydroxypropyl carbamate | 971.0 |
| methyl isobutyl ketone | 452.9 |
| dibutyltin dilaurate | 0.9 |
| isophorone diisocyanate | 888.0 |
| DOWANOL PM | 907.7 |

The first three ingredients were charged to a suitable reactor under a nitrogen blanket and heated to 80° C. Isophorone diisocyanate was added to the reactor over a period of 5 hours and 25 minutes. The reaction was held at temperature until no isocyanate was detectable by infrared spectroscopy and then thinned with DOWANOL PM. The resulting transparent resin has a measured solids (110° C./1 hour) of 68.6 percent, a viscosity of T on the Gardner-Holt viscosity scale, a Mn of 747 and a weight average molecular weight of 797 as determined by gel permeation chromatography. The calculated carbamate equivalent weight was 230.

EXAMPLE K

An amide functional acrylic polymer was prepared from the following ingredients:

| Ingredient | Weight in grams |
|---|---|
| Charge 1 | |
| DOWANOL PM | 400.0 |
| triphenylphosphite | 2.00 |
| Charge 2 | |
| LUPERSOL PMS[1] | 108.0 |
| DOWANOL PM | 50.0 |
| Charge 3 | |
| methacrylamide | 207.0 |
| DOWANOL PM | 828.0 |
| acrylic acid | 18.0 |
| Charge 4 | |
| butyl acrylate | 270.0 |
| butyl methacrylate | 207.0 |
| styrene | 180.0 |
| methyl styrene dimer | 18.0 |
| Charge 5 | |
| LUPERSOL PMS | 18.0 |
| DOWANOL PM | 18.0 |

[1]Fifty percent solution of t-butyl peroctoate in odorless mineral spirits, available from Atochem North America, Inc., Philadelphia, Pennsylvania.

Charge 1 was added to a suitable reactor equipped with a condenser and heated to reflux (120° C.). Charges 2, 3 and 4 were each separately mixed. Charge 2 was added to the reactor over 3.5 hours. Addition of Charges 3 and 4 began 15 minutes after the beginning of Charge 2 and was carried out over a period of 3 hours. After the completion of Charges 3 and 4, the reaction was held at reflux for 1 hour. Charge 5 was then added over 0.5 hours and the reaction held after the completion of this charge for an additional 2 hours. Approximately 700 grams of solvent were then removed from the reaction product under reduced pressure. The resulting resin had a final measured solids content of 59.3 percent, a viscosity of Y+ on the Gardner-Holt scale, a Mn of 2629 and a weight average molecular weight of 5504 as determined by gel permeation chromatography.

The following examples (1–10) show the preparation of various clear film-forming flexible compositions prepared with carbamate and/or hydroxyl functional materials and aminoplast curing agents. The coating compositions were evaluated in color-plus-clear applications.

EXAMPLE 1

A clear film-forming composition containing carbamate functional polyether, acrylic and polyurethane polymers were prepared by mixing together the following ingredients:

| Ingredient | Solid weight in grams | Solution weight in grams |
|---|---|---|
| Propylene glycol methyl ether acetate | — | 4.8 |
| SOLVESSO 100 | — | 9.5 |
| oxo-hexyl acetate | — | 10.3 |
| n-propanol | — | 15.0 |
| xylene | — | 9.0 |
| TINUVIN 328[1] | 3.0 | 3.0 |
| AEROSIL R812 dispersion[2] | 5.5 | 12.5 |
| RESIMENE 741[3] | 35.0 | 39.7 |
| carbamate containing polyether of Example B | 15.0 | 15.0 |
| carbamate containing acrylic polymer of Example G | 10.5 | 16.6 |
| carbamate containing polyurethane of Example D | 35.0 | 45.6 |
| DOW CORNING 200[4] | 0.004 | 0.74 |
| BYK 325[5] | 0.02 | 0.13 |
| Polybutylacrylate[6] | 0.25 | 0.42 |
| phenyl acid phosphate | 0.15 | 0.2 |
| Dodecylbenzene sulfonic acid | 0.75 | 1.10 |

[1]Substituted benzotriazole UV light absorber available from Ciba Geigy Corporation, Hawthorne, New York.

-continued

| Ingredient | Solid weight in grams | Solution weight in grams |
|---|---|---|

[2] Eight parts by weight (pbw) of a highly dispersed hydrophobic amorphous silicon dioxide available from Degussa Corporation; 50 pbw of a solution of hydroxyl functional acrylic polymer having a peak molecular weight of 8000, Mw of 9000, Mn of 3500 (determined by gel permeation chromatography using a polystryene standard) made from 40 percent hydroxypropyl acrylate, 20 percent styrene, 19 percent butyl acrylate, 18.5 percent butyl methacrylate, 0.5 percent methyl methacrylate, 2 percent acrylic acid at 70 percent solids in isobutanol, xylene and SOLVESSO 100; 48.75 pbw xylene; 1.5 pbw isbutanol; 6.75 pbw SOLVESSO 100.
[3] Partially methylated aminoplast resin available from Monsanto Chemical Company, St. Louis, Missouri.
[4] Solution of polymethylsiloxane available from Dow Corning Corporation, Midland, Michigan.
[5] Solution of polyoxyalkylene-methylalkyl-polysiloxane copolymer available from Byk-Chemie, Germany, a subsidiary of Altana Group.
[6] Flow control agent having a Mw (weight average molecular weight) of about 6700 and a Mn of about 2600, made in xylene at 60 percent solids.

I the abbreviations have the following meaning: "Eg." for Example, "Wt." for Weight and "Soln." for solution.

TABLE I

| | Comparative Eg. (i) | | Comparative Eg. (ii) | | Comparative Eg. (iii) | |
|---|---|---|---|---|---|---|
| Ingredient | Solid Wt. | Soln. Wt. | Solid Wt. | Soln. Wt. | Solid Wt. | Soln. Wt. |
| Propylene glycol methyl ether acetate | — | 4.8 | — | 4.8 | — | — |
| SOLVESSO 100 | — | 9.5 | — | 9.5 | — | — |
| oxo-hexyl acetate | — | 10.3 | — | 10.3 | — | — |
| n-propanol | — | 15.0 | — | 15.0 | — | 15.1 |
| xylene | — | 9.0 | — | 9.0 | — | 19.5 |
| TINUVIN 328 | 3.0 | 3.0 | 3.0 | 3.0 | 3.0 | 3.0 |
| AEROSIL R812 dispersion | 5.5 | 12.5 | 5.5 | 12.5 | 5.5 | 12.5 |
| Polyester urethane polyol[3] | — | — | — | — | 41.0 | 46.0 |
| RESIMENE 741 | 35.0 | 39.7 | 20.0 | 22.7 | 25.0 | 28.2 |
| MR225[4] | — | — | — | — | 10.0 | 15.4 |
| Acrylic polymer[1] | — | — | — | — | 9.5 | 26.4 |
| POLYMEG 1000 | 15.0 | 15.0 | 15.0 | 15.0 | 10.0 | 10.0 |
| Acrylic polymer[1] | 10.5 | 16.6 | 10.5 | 15.0 | — | — |
| Polyester urethane polyol[2] | 35.0 | 45.6 | 49.5 | 55.0 | — | — |
| DOW CORNING 200 | 0.004 | 0.74 | 0.004 | 0.74 | 0.004 | 0.74 |
| BYK 325 | 0.02 | 0.13 | 0.02 | 0.13 | 0.02 | 0.13 |
| TINUVIN 292[5] | — | — | — | — | 0.88 | 0.88 |
| Polybutylacrylate of Example 1 | 0.25 | 0.42 | — | — | 0.25 | 0.42 |
| anti-sag agent | — | — | 0.5* | 1.4 | — | — |
| phenyl acid phosphate | 0.15 | 0.2 | — | — | 0.15 | 0.2 |
| Dodecylbenzene sulfonic acid | 0.75 | 1.10 | 0.8 | 1.2 | 0.75 | 1.10 |

FOOTNOTES (TABLE I)
[1] Acrylic polymer described in footnote 2 of Example 1.
[2] Linear polyester urethane described in footnote 1 of Example D.
[3] Reaction product of 1,6-hexane diol, hexahydrophthalic anhydride, neopentyl glycol and DESMODUR W (an aliphatic diisocyanate available from Miles, Inc.) in a 1:1.2:1:0.73 mole ratio, having a hydroxyl value of 183 based on weight of resin solids, 90 percent in DOWANOL PM acetate.
[4] Partially butylated polymeric melamine resin available from Monsanto Co.
[5] Sterically hindered tertiary amine light stabilizer available from Ciba Geigy Corporation.

Comparative Examples (i), (ii) and (iii) (Controls)

A clear film-forming composition analogous to Example 1, but containing only hydroxyl functional polymers, was prepared by mixing together the ingredients depicted in Table I below for Comparative Example (i). As well, a clear film-forming composition having many similarities to Example 3 but containing only hydroxyl functional polymers was prepared by mixing together the ingredients of Comparative Example (ii). Also, a clear film-forming composition containing only hydroxyl functional polymers was prepared by mixing together the ingredients of Comparative Example (iii). Both of these are depicted in Table I. In Table

EXAMPLE 2

A clear film-forming composition containing carbamate functional polyether, acrylic and cycloaliphatic anhydride-derived polyester polymers were prepared by mixing together the following ingredients:

| Ingredient | Solid weight in grams | Solution weight in grams |
| --- | --- | --- |
| Propylene glycol methyl ether acetate | — | 4.8 |
| SOLVESSO 100 | — | 9.5 |
| oxo-hexyl acetate | — | 10.3 |
| n-propanol | — | 15.0 |
| xylene | — | 9.0 |
| TINUVIN 328 | 3.0 | 3.0 |
| AEROSIL R812 dispersion | 5.5 | 12.5 |
| RESIMENE 741 | 20.0 | 22.7 |
| Anti-sagging agent[1] | 0.5 | 1.4 |
| carbamate containing polyether of Example B | 15.0 | 15.0 |
| carbamate containing acrylic polymer of Example G | 10.5 | 16.6 |
| carbamate containing polyester of Example F | 49.5 | 64.5 |
| DOW CORNING 200 | 0.004 | 0.74 |
| BYK 325 | 0.02 | 0.13 |
| Dodecylbenzene sulfonic acid | 0.8 | 1.2 |

[1]Polymeric microparticle prepared in accordance with U.S. Pat. No. 4,147,688, Example 11.

EXAMPLE 3

A clear film-forming composition was prepared as in Example 1, except that the carbamate-containing polyether of Example B was replaced with the carbamate-containing polyether of Example A.

EXAMPLE 4

A clear film-forming composition was prepared as in Example 1 except that the carbamate-containing polyether of Example B was replaced with the carbamate-containing polyether of Example C.

Thermoplastic polyolefin test substrates available from Himont Advanced Materials, Frankfurt, Germany, as ETA-3183 were prepared for coating and acid etch testing by first spray applying a solventborne adhesion promoter available from PPG Industries, Inc., as MPP4110, to the substrate at a thickness of 0.25 mils (6.35 microns) at ambient atmospheric conditions. The resulting film was dried at ambient atmospheric conditions for two minutes. The promoter was then immediately coated with 1.0 mils (25.4 microns) of a solventborne elastomeric pigmented base coat composition, commercially available from PPG Industries, Inc. and identified as CBC-7517C. The clear film-forming compositions of Examples 1–4 and the controls i, ii and iii were then applied separately wet-on-wet at a thickness of 1.6 mils (40.6 microns) to seven base coated substrates.

The resultant composite coatings were cured at 250° F. (121.1° C.) for 30 minutes to cure both the base coat and clear coat. The panels were baked in a horizontal position. The properties of the composite coatings are reported in Table II below.

TABLE II

| Example | % OH Functional Resin Based on Weight of Resin Solids[1] | Hydroxyl Number of Composition Based on Weight of Resin Solids | Acid Etch Rating[2] (110° F.) | Acid Etch Rating[3] (180° F.) | Cold Flex[4] |
| --- | --- | --- | --- | --- | --- |
| 1 | 4.5 | 8 | 2 | 3 | 10 |
| Control (i) | 65 | 96 | 8 | 9 | 10 |
| 2 | 4.5 | 8 | 2 | 2 | 8 |
| Control (ii) | 79.5 | 118 | 8 | 9 | 10 |
| 3 | 4.5 | 8 | 3 | 3 | 9+ |
| 4 | 4.5 | 8 | 2 | 3 | 10 |
| Control (iii) | 69.5 | 111 | 9 | 9 | 10 |

[1]Note that all the compositions had at least 4.5 percent OH functionality by weight due to the acrylic polymer (see footnote 2 of Example 1) added to the formulation.
[2,3]Test panels were made in triplicate and spotted four times with 0.2 milliliter (ml) of a sulfurous acid solution (350 grams deionized water and 12 grams sulfurous acid to give a pH of 2.0 plus or minus 0.1) using a 23 gauge syringe. The panels, with drops uncovered, were then placed in electric ovens at 110° F. (43.3° C.) and at 180° F. (82.2° C.) for 30 minutes. The panels were removed from the ovens and were washed with soap and water and dried, then rated for degree of
acid etch resistance on a scale of 1–10 (1 = no observable etching; 10 = severe etching).
[4]Brittleness of the color-plus-clear composite coating over primed RIM (Reaction Injection Molding) substrate was tested using General Motors specification 9503P. Also see U.S. Pat. No. 4,540,766 column 2, lines 36–57. The coated plastic substrate was cooled to 0° F. (−17.8° C.) and bent around a half-inch (1.27 cm) mandrel. A value of 10 indicates no cracking of the composite coating.

The data in Table II illustrate the improved acid etch resistant properties of the composition of the present invention when compared to conventional hydroxyl-aminoplast coating compositions. Note that flexibility is maintained.

EXAMPLE 5

A clear film-forming composition containing a carbamate functional polyester polymer derived from a cycloaliphatic anhydride was prepared by mixing together the following ingredients:

| Ingredient | Solid weight in grams | Solution weight in grams |
| --- | --- | --- |
| n-butanol | — | 15 |
| 2-butoxyethyl ester of acetic acid | — | 5 |
| xylene | — | 15 |
| DOWANOL PM | — | 10 |
| n-propanol | — | 5 |
| TINLTVIN 328 | 3.0 | 3.0 |
| AEROSIL R812 dispersion | 5.5 | 12.5 |
| RESIMENE 741 | 20.0 | 23.0 |
| Carbamate containing polyether of Example B | 20 | 20 |
| DOW CORNING 200 | 0.004 | 0.74 |
| BAYSILONE OL-17 fluid[1] | — | 0.15 |
| Polybutylacrylate of Example 1 | 0.25 | 0.42 |
| Dodecylbenzene sulfonic acid | 0.75 | 1.10 |
| Carbamate containing acrylic polymer of Example G | 10.5 | 18.04 |
| Carbamate containing polyester of Example F | 45 | 63 |

[1] Polyether polysiloxane fluid available from Bayer U.S.A.

EXAMPLE 6

A clear film-forming composition containing a carbamate functional polyester polymer was prepared as in Example 5, except that the carbamate containing polyester derived from a cycloaliphatic acid of Example F was replaced by the carbamate containing polyester derived from a linear acid of Example H.

EXAMPLE 7

A clear film-forming composition formulated without carbamate-functional acrylic was prepared by mixing together the following ingredients:

| Ingredient | Solid weight in grams | Solution weight in grams |
| --- | --- | --- |
| n-butanol | — | 49.5 |
| 2-butoxyethyl acetate | — | 16.5 |
| xylene | — | 49.5 |
| propylene glycol monomethyl ether | — | 33.0 |
| n-propanol | — | 16.5 |
| TINUVIN 328 | 9.9 | 39.6 |
| AEROSIL 812 dispersion | 18.2 | 42.9 |
| RESIMENE 741 | 66.0 | 75.9 |
| carbamate containing polyether of Example B | 66.0 | 66.0 |
| DOW CORNING 200 | — | 2.4 |
| BAYSILONE OL-17 | — | 0.5 |
| Polybutylacrylate of Example 1 | 0.83 | 1.39 |
| dodecylbenzene sulfonic acid | 2.6 | 3.63 |
| carbamate containing polyester of Example I | 183.2 | 258.4 |

Thermoplastic polyolefin test substrates available from D & S Plastics Co., Auburn Hills, Mich., as TPO 880 were prepared for coating as were those used in Examples 1 to 4 and controls i, ii and iii. The base coat composition used is commercially available from PPG Industries, Inc. and identified as CEC-1855C. The clear film-forming compositions of Examples 5 to 7 were then applied separately wet-on-wet at a thickness of approximately 2 mils (50.8 microns) to three base-coated substrates.

The resultant composite coatings were cured as were the compositions of Examples 1 to 4 and controls i, ii and iii. The properties of the composite coatings are reported in Tables III and IV below.

TABLE III

| Example | Jacksonville Etch[1] | Fort Lauderdale Spot[2] |
| --- | --- | --- |
| 5 | 1 | 3 |
| 6 | 10 | 10 |

[1] Data was collected at the Jacksonville, Florida PPG atmospheric test site on Blount Island. 4 x 6 inch (10.16 x 15.24 cm) test specimens are mounted on 4 x 12 inch (10.16 x 30.48 cm) aluminum panels and placed horizontally on exposure racks. The above data were collected during one season from May to September. Topcoat damage at this site is caused by chemical etching (1 = no observable etching, 10 = spotting with extensive material loss within a spot failure).
[2] Data was collected at the Fort Lauderdale, Florida PPG atmospheric test site. 4 x 6 inch (10.16 x 15.24 cm) test specimens are mounted on 4 x 12 inch (10.16 x 30.48 cm) aluminum panels and exposed facing south at an angle of 5 degrees with no insulation. The above data was collected during one season from May to September. Topcoat damage at this site is recorded as "spotting" and is caused by solid particle deposits on the surface. (1 = no observable damage, 10 = spotting with hard ion deposit).

TABLE IV

| Example | Etch $(H_2SO_4)$[1] | Etch $(HNO_3)$[2] | QUV Waterspot[3] | Cold flex[4] |
| --- | --- | --- | --- | --- |
| 5 | 2 | 1 | good | 9 |
| 6 | 3 | 1 | very bad | 10 |
| 7 | 2 | 1 | very good | 8 |

[1,2] Test panels were spotted with two superimposed drops of 0.6 N sulfuric acid and two superimposed drops of 0.6 N nitric acid and placed in an electric oven at 120° F. for 30 minutes. The panels were removed from the ovens, rinsed and evaluated on a 0–4 scale (0 = no observable etching, 4 = severe etching).
[3] Panels were evaluated after 359 hours in a Q-U-V Accelerated Weathering Tester (The Q Panel Co., Cleveland, Ohio). The panels were irradiated with UVA-340 bulbs (Q-Panel Co.) at 0.72 W/m$^2$ for four hours at 70° C. followed by a four-hour water condensation cycle at 50° C. The irradiation level was controlled by a SOLAR EYE UV irradiation controller. The panels were removed from the testing device and water spotting evaluated visually as shown above.
[4] Brittleness of the color-plus-clear composite coating over ESTANE 58130 TPU (available from B. F. Goodrich Company) was tested by cooling the coated plastic substrate to 0° F. (-17° C.) for 24 hours and bending it over a 1 inch (2.54 cm) mandrel. See footnote 4 of Table 1 for rating scale.

The data in Table III indicate that coating compositions containing polyesters derived from cycloaliphatic diacids (Example 5) are much more durable with respect to outdoor exposure than are compositions containing polyesters derived from linear diacids (Example 6). Note, however, that polyesters derived from lower alkyl linear diacids, such as adipic acid, are preferred for durability over polyesters derived from higher alkyl diacids such as sebacic acid, which was used in the coating composition in Example 6. The polyester used in the composition of Example 6 provides exceptional flexibility and acid etch resistance, as is shown in Table IV.

Data in Table IV indicate that compositions of the present invention demonstrate excellent acid etch resistance and flexibility, although the composition containing the polyester derived from sebacic acid (Example 6) had poor water-spot resistance.

Examples 8 to 12 illustrate the preparation of various film-forming compositions in accordance with the present invention and as comparative examples. Example 8 illustrates the preparation of a film-forming composition containing a hydroxyl functional polyurethane oligomer at 20.5 percent by weight of total resin solids, as well as both a carbamate functional acrylic polymer (15 percent by weight of total resin solids) and a carbamate functional polyester polymer (20 percent by weight of total resin solids). Example 9 is comparative; the film-forming composition contains no polyurethane oligomer. Example 10 illustrates the preparation of a film-forming composition containing a carbamate functional polyurethane oligomer at 39.5 percent by weight of total resin solids, as well as a carbamate functional acrylic polymer at 10 percent by weight of total resin solids. Example 11 illustrates the preparation of a film-forming composition containing a hydroxyl functional polyurethane oligomer at 45.5 percent by weight of total resin solids, as well as a carbamate functional acrylic polymer at 15 percent by weight of total resin solids. Example 12 illustrates the preparation of a film-forming composition containing a carbamate functional polyurethane oligomer at 50.5 percent by weight of total resin solids.

wet-on-wet at a thickness of 1.6 mils (40.6 microns) to six base coated substrates. In addition, six thermoplastic urethane panels (available from B. F. Goodrich Company as ESTANE 58130 TPU) were coated with the same base coat as used above and then seperately coated with the clear coat compositions of Examples 8 to 12 and the same conventional hydroxyl-aminoplast clear coat as used above. The film-forming compositions of Examples 8 to 12 were compared to the conventional hydroxylaminoplast clear coat which was used as a control.

The resultant composite coatings were cured at 250° F. (121.1° C.) for 30 minutes to cure both the base coat and clear coat. The panels were baked in a horizontal position. The properties of the composite coatings are reported in Table V below.

|  | EXAMPLE | | | | |
|---|---|---|---|---|---|
|  | 8 | 9 | 10 | 11 | 12 |
| Ingredient | Total weight in grams | Total weight in grams | Total weight in grams | Total weight in grams | Total weight in grams |
| n-butanol | 15 | 15 | 15 | 15 | 15 |
| 2-butoxyethyl acetate | 5 | 5 | 5 | 5 | 5 |
| xylene | 15 | 15 | 15 | 15 | 15 |
| Propylene glycol methyl ether | 10 | 10 | 10 | 10 | 10 |
| n-propanol | 5 | 5 | 5 | 5 | 5 |
| TINUVIN 328 | 3.0 | 3.0 | 3.0 | 3.0 | 3.0 |
| xylene | 9.0 | 9.0 | 9.0 | 9.0 | 9.0 |
| AEROSIL R812 dispersion | 12.5 | 12.5 | 12.5 | 12.5 | 12.5 |
| RESIMENE 741 | 28 | 23 | 34 | 28.5 | 39.7 |
| carbamate containing polyether of Example B | 15 | 20 | 15 | 10 | 10 |
| carbamate containing polyurethane oligomer of Example J | — | — | 57.6 | — | 73.6 |
| SETALUX EPC/90/2/48 polyurethane polyol[1] | 34 | — | — | 68 | — |
| carbamate containing polyester of Example F | 27.7 | 62.5 | — | — | — |
| carbamate containing acrylic of Example G | 25 | 17 | 16.7 | 25 | — |
| DOW CORNING 200 | 0.74 | 0.74 | 0.74 | 0.74 | 0.74 |
| BYK 325 | — | — | — | — | 0.13 |
| Polybutylacrylate of Example 1 | 0.42 | 0.42 | 0.42 | 0.42 | 0.42 |
| Dodecylbenzene sulfonic acid[2] | 1.10 | 1.10 | 1.10 | 1.10 | 1.10 |

[1]Oligomeric polyurethane polyol available from Industrial Colors and Chemicals Limited, manufactured by AKZO NOBEL Resins, East Saint Louis, Illinois. It is the reaction product of DESMODUR N3390 (Polyisocyanate based on hexamethylene diisocyanate, available from BAYER U.S.A., Pittsburgh, Pennsylvania) and butyl ethyl propane diol.
[2]Solution of dodecylbenzene sulfonic acid at 70 percent solids in deionized water Thermoplastic polyolefin test substrates available from Himont Advanced Materials as ETA-3183 were prepared for coating as in Examples 1 to 4. The clear film-forming compositions of Examples 8 to 12 and a conventional hydroxylaminoplast clear coat available from PPG Industries, Inc., as UCC1001N were then applied separately

TABLE V

| Example | Cold Flex[1] | Etch ($H_2SO_4$) | Etch ($HNO_3$) | QUV Waterspot | Fort Lauderdale spot[2] |
|---|---|---|---|---|---|
| 8 | 8 | 0 | 1 | no spot | 3 |
| 9 (Comparative) | 8+ | 1 | 1 | slight spotting | 5 |

TABLE V-continued

| Example | Cold Flex[1] | Etch ($H_2SO_4$) | Etch ($HNO_3$) | QUV Waterspot | Fort Lauderdale spot[2] |
|---|---|---|---|---|---|
| 10 | 8 | 1 | 1 | no spot | 3 |
| 11 | 4 | 2 | 2 | no spot | 1 |
| 12 | 4 | 0 | 0 | no spot | 1 |
| UCC1001N Control | 8+ | 3 | 3 | dense spotting | 10 |

[1]See Footnote 4 of Table IV.
[2]Data was collected at the Fort Lauderdale, Florida PPG atmospheric test site after one season from May 1995 to June 1996

The data in Table V illustrate the improved acid etch and spotting resistance properties of the composition of the present invention when compared to conventional hydroxylaminoplast aminoplast coating compositions (Control) and improved waterspot resistance of the composition of the present invention when compared to compositions that do not contain polyurethane oligomer (Example 9). Note that high flexibility is maintained when the polyurethane oligomer is present within preferred ranges.

Examples 13 to 19 illustrate the preparation of various film-forming compositions in accordance with the present invention and as comparative examples. Example 13 (comparative) illustrates the preparation of a film-forming composition containing a carbamate functional acrylic polymer (15 percent by weight of total resin solids) and a hydrophobic silica (1 percent by weight on total resin solids). Examples 14 and 15 each contain 1 percent by weight on total resin solids of a hydrophilic silica; example 14 contains an amide functional acrylic polymer and example 15 (comparative) contains a carbamate functional acrylic polymer. Examples 16 and 17 each contain 1.5 percent by weight on total resin solids of a hydrophilic silica—Example 16 contains an amide functional acrylic polymer and Example 17 (comparative) contains a carbamate functional acrylic polymer. Examples 18 and 19 each contain 2 percent by weight on total resin solids of a hydrophilic silica—Example 18 contains an amide functional acrylic polymer and Example 19 (comparative) contains a carbamate functional acrylic polymer. The various film-forming compositions were prepared by mixing together the listed ingredients.

| Ingredient | 13 Total weight in grams | 14 Total weight in gratns | 15 Total weight in grams | 16 Total weight in grams | 17 Total weight in grams | 18 Total weight in grams | 19 Total weight in grams |
|---|---|---|---|---|---|---|---|
| n-butanol | 15 | 41.3 | 41.3 | 41.3 | 41.3 | 41.3 | 41.3 |
| 2-butoxyethyl acetate | 5 | 13.8 | 13.8 | 13.8 | 13.8 | 13.8 | 13.8 |
| xylene | 15 | 41.3 | 41.3 | 41.3 | 41.3 | 41.3 | 41.3 |
| Propylene glycol methyl ether | 10 | 27.6 | 27.6 | 27.6 | 27.6 | 27.6 | 27.6 |
| n-propanol | 5 | 13.8 | 13.8 | 13.8 | 13.8 | 13.8 | 13.8 |
| TINUVIN 328 | 3.0 | 8.3 | 8.3 | 8.3 | 8.3 | 8.3 | 8.3 |
| xylene | 9.0 | 24.8 | 24.8 | 24.8 | 24.8 | 24.8 | 24.8 |
| AEROSIL R812 dispersion | 13 | — | — | — | — | — | — |
| AEROSIL 300 dispersion[1] | — | 63.5 | 64 | 95.3 | 95.3 | 127 | 127 |
| RESIMENE 741 | 28.4 | 78.3 | 78.3 | 78.3 | 78.3 | 78.3 | 78.3 |
| carbamate functional polyether of Example B | 15 | 41.3 | 41.3 | 41.3 | 41.3 | 41.3 | 41.3 |
| SETALUX EPC/90/2/48 polyurethane polyol | 37.3 | 102.8 | 102.8 | 102.8 | 102.8 | 102.8 | 102.8 |
| carbamate functional polyester of Example F | 22 | 45 | 45 | 28.6 | 29 | 12.6 | 13 |
| carbamate functional acrylic of Example G | 24 | — | 66 | — | 66 | — | 66 |
| amide functional acrylic of Example K | — | 70 | — | 70 | — | 70 | — |
| DOW CORNING 200 | 0.74 | 2.04 | 2.04 | 2.04 | 2.04 | 2.04 | 2.04 |
| BAYSILONE OL 17 | 0.15 | 0.41 | 0.41 | 0.41 | 0.41 | 0.41 | 0.41 |
| Polybutylacrylate of Example 1 | 0.42 | 1.16 | 1.16 | 1.16 | 1.16 | 1.16 | 1.16 |
| Dodecylbenzene sulfonic acid, 70% | 1.10 | 3.03 | 3.03 | 3.03 | 3.03 | 3.03 | 3.03 |

[1]4.34 parts by weight (pbw) of a highly dispersed hydrophilic amorphous silicon dioxide available from Degussa Corporation; 50.2 pbw of the carbamate functional polyester of Example C; 45.5 pbw xylene; ground for 30 minutes at 3500 rpm with zircoa media in an Eiger mill.

Thermoplastic polyolefin test substrates available from Himont Advanced Materials as ETA-3183 were prepared for coating as in Examples 1 to 4 and controls i, ii and iii. The clear film-forming compositions of Examples 13 to 19 and a conventional hydroxyl-aminoplast clear coat available from PPG Industries, Inc., as UCC1001W, were then applied separately wet-on-wet at a thickness of 1.6 mils (40.6 microns) to eight base coated substrates. In addition, eight thermoplastic urethane panels (available from B. F. Goodrich Company as ESTANE 58130 TPU) were each coated with the same base coat as used above and then separately coated with the clear coat compositions of Examples 13 to 19 and the same conventional hydroxyl-aminoplast clear coat as used above. The film-forming compositions of Examples 14, 16 and 18 were compared to those of Examples 13, 15, 17 and 19 and the conventional hydroxyl-aminoplast clear coat which was used as a control.

The resultant composite coatings were cured at 250° F. (121.1° C.) for 30 minutes to cure both the base coat and clear coat. The panels were coated and baked in a vertical position. The properties of the composite coatings are reported in Table VI below.

TABLE VI

| Example | Level of Silica | Cold Flex[1] | Etch[2] HCl | $H_2SO_4$ | $HNO_3$ | Sag[3] | DOI[4] |
|---|---|---|---|---|---|---|---|
| minutes | | | 30/60 | 30/60 | 30/60 | | |
| UCC1001W (Control) | 1%* | 4–6 | 4/5 | 1/5 | 3/5 | 21 | 40 |
| 13 | 1%* | 4–6 | 0/0 | 0/5 | 2/2 | 25 | 60 |
| 14 | 1% | 4–6 | 0/1 | 0/5 | 2/2 | 17 | 85 |
| 15 | 1% | 4–6 | 0/1 | 0/5 | 2/2 | 37 | 75 |
| 16 | 1.5% | 4–6 | 0/1 | 0/5 | 2/2 | 16 | 80 |
| 17 | 1.5% | 4–6 | 0/0 | 0/5 | 2/2 | 35 | 75 |
| 18 | 2% | 4–6 | 0/1 | 0/5 | 2/2 | 9 | 95 |
| 19 | 2% | 4–6 | 0/1 | 0/5 | 2/2 | 35 | 70 |

*hydrophobic silica.
[1]See Footnote 4 of Table III.
[2]Two sets of test panels were spotted with two superimposed drops of 0.6 N hydrochloric acid, two superimposed drops of 0.6 N sulfuric acid and two superimposed drops of 0.6 N nitric acid and placed in an electric oven at 120° F. (48.9° C.) for 30 minutes (Set #1) and for 60 minutes (Set #2). The panels were removed from the ovens, rinsed and evaluated on a 0–5 scale (0 = no observable etching, 5 = severe etching) and the results are recorded in Table VI above where the first column set of numbers is for the 30 minute set and second column set of numbers is for the 60 minute set.
[3]Sag was measured from the bottom of a prepunched hole 8 mm in diameter, located ½ inch (1.27 cm) from the top of the vertical panel. Numbers reported are in millimeters and reflect a measurement of the length of a sag so lower numbers are better by indicating a shorter sag distance.
[4]Visual rating of "distinctness of image", or the mirror-like quality of a coating, by determining the clarity of a reflected image on the cured coating on a scale of 0 to 100 (0 = no clarity; 100 = perfect clarity) using a Distinctness of Image (DOI) GLOW-BOX available from Instruments for Research and Industry, Inc.

The data in Table VI illustrate the greatly improved sag resistance and distinctness of image properties of the composition of the present invention (Examples 14, 16 and 18) in the preferred embodiment of the invention containing an amide functional acrylic polymer when compared to conventional hydroxyl-aminoplast coating compositions (Control) and when compared to compositions that do not contain amide functional acrylic polymers (Examples 13, 15, 17 and 19). Note that acid etch resistance and flexibility are maintained when the amide functional acrylic polymer is present.

We claim:

1. A flexible, curable film-forming composition comprising:

(A) polyether polymer containing a plurality of carbamate groups of the structure:

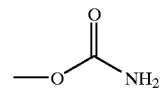

Structure I selected from the group consisting of terminal, pendant, and terminal and pendant present in the film-forming composition in amounts of 5 to 40 percent by weight based on the total weight of resin solids in the film-forming composition;

(B) at least one of the polymeric materials selected from the group consisting of:
(i) polyurethane polyol having a plurality of hydroxyl groups selected from terminal, pendant, and terminal and pendant hydroxyl groups and which optionally has a plurality of carbamate groups of Structure I selected from the group consisting of terminal, pendant, and terminal and pendant carbamate groups; and
(ii) polyester polymer, polyurethane polymer, and acrylic polymer, each of these polymers, when present, contains a plurality of carbamate groups of Structure I selected from the group consisting of terminal carbamate groups, pendant carbamate groups, and terminal and pendant carbamate groups, with urethane oligomers having carbamate groups of Structure I selected from the group consisting of pendant, terminal, and pendant and terminal groups; and
(iii) mixtures thereof from polymeric materials of (Bi) and (Bii), and (C) a crosslinking agent consisting essentially of aminoplast containing methylol groups, methylol ether groups, or mixtures thereof selected from the group consisting of: 1) the reaction product of formaldehyde, acetaldehyde, crotonaldehyde and benzaldehyde with an amine, amide, carbamate, urea or benzoguanamine; and 2) aldehyde condensates of glycoluril.

2. The film-forming composition of claim 1 which includes urethane oligomers having carbamate groups of Structure I selected from the group consisting of pendant, terminal, and pendant and terminal groups along with the polyurethane polyol of (B)(i).

3. The film-forming composition of claim 1 which includes at least one polymer of polyester polymer, polyurethane polymer, and acrylic polymer, each of these polymers, when present, contains a plurality of carbamate groups of Structure I selected from the group consisting of terminal carbamate groups, pendant carbamate groups, and terminal and pendant carbamate groups along with the polyurethane polyol of (B)(i).

4. The film-forming composition of claim 1 wherein said polyether polymer has on average up to two of said terminal or pendant carbamate groups per molecule.

5. The film-forming composition of claim 1 wherein said polyether polymer has an equivalent weight of from about 140 to about 2500 based on equivalents of said carbamate groups.

6. The film-forming composition of claim 1 wherein said aminoplast is a condensate of melamine with formaldehyde and, optionally, an alcohol containing from 1 to 6 carbon atoms.

7. The film-forming composition of claim 1 wherein the equivalent ratio of carbamate groups to methylol or methylol ether groups is from about 0.5 to about 2:1 and is sufficient to form a crosslinked film.

8. The film-forming composition of claim 1 wherein the polyether polymer is present in the film-forming composition in amounts of about 10 to about 30 percent by weight based on the total weight of resin solids in the film-forming composition.

9. The film-forming composition of claim 1 wherein the aminoplast is present in the film-forming composition in amounts of about 15 to about 50 percent based on the total weight of resin solids in the film-forming composition.

10. The film-forming composition of claim 1 wherein component (Bii) is a polyester polymer and is present in the film-forming composition in amounts up to about 60 percent by weight based on the total weight of resin solids in the film-forming composition.

11. The film-forming composition of claim 10 wherein the polyester polymer is derived from a cycloaliphatic acid or anhydride.

12. The film-forming composition of claim 11 wherein said cycloaliphatic acid or anhydride is selected from the group consisting of hexahydrophthalic acid, hexahydrophthalic anhydride, methylhexahydrophthalic acid and methylhexahydrophthalic anhydride.

13. The film-forming composition of claim 1 wherein component (Bii) is an acrylic polymer and is present in the film-forming composition in amounts up to about 20 percent by weight based on the total weight of resin solids in the film-forming composition.

14. The film-forming composition of claim 1 wherein the polyurethane and urethane oligomer of component (Bii) and polyurethane polyol of component (Bi) are derived from an isocyanate and any one of which is present in the film-forming composition in amounts up to about 55 percent by weight based on the total weight of resin solids in the film-forming composition.

15. The film-forming composition of claim 14 wherein said polyurethane and urethane oligomer of component (Bii) and polyurethane polyol of component (Bi) when present have a number average molecular weight of from about 300 to about 3100 as determined by gel permeation chromatography using a polystyrene standard.

16. The film-forming composition of claim 1 wherein said polyurethane polyol contains a plurality of terminal hydroxyl groups.

17. The film-forming composition of claim 16 wherein said polyurethane polyol is a reaction product of butyl ethyl propane diol and an isocyanurate of hexamethylene diisocyanate.

18. The film-forming composition of claim 1 wherein said urethane oligomer contains a plurality of terminal carbamate groups as the reaction product of hydroxypropyl carbamate and isophorone diisocyanate.

19. The film-forming composition of claim 1 further comprising an acrylic polymer containing a plurality of amide groups and, optionally, a plurality of terminal, pendant, or terminal and pendant carbamate groups of the Structure I.

20. The film-forming composition of claim 19 wherein the acrylic polymer containing a plurality of amide groups is present in the film-forming composition in amounts up to about 30 percent by weight based on the total weight of resin solids in the film-forming composition.

21. The film-forming composition of claim 19 further comprising an amorphous fumed silica.

22. The film-forming composition of claim 21 wherein the amorphous fumed silica is present in the film-forming composition in amounts of about 1 to about 2 percent by weight based on the total weight of resin solids in the film-forming composition.

23. The film-forming composition of claim 1 wherein said composition is suitable for application over a plastic substrate comprising a flexible thermosetting or thermoplastic material.

24. The film-forming composition of claim 1 present as a clear film-forming composition serving as a transparent coat over a pigmented film-forming composition serving as the base coat of a multi-component composite coating composition.

25. A flexible, curable film-forming composition comprising:
A) at least three polymeric components each having functional groups selected from the group consisting of, one from each of (i), (ii) and (iii):
(i) polyether polymer containing a plurality of terminal or pendant carbamate groups of the structure:

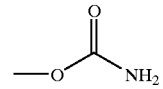

Structure I present in the film-forming composition in amounts of 5 to 40 percent by weight based on the total weight of resin solids in the film-forming composition;
(ii) at least one of the polymers selected from the group consisting of: polyester polymer, polyurethane polymer, and acrylic polymer, each of these polymers, when present, contains a plurality of carbamate groups of Structure I selected from terminal carbamate groups, pendant carbamate groups, and terminal and pendant carbamate groups, and polyurethane polyol having a plurality of hydroxyl groups selected from terminal, pendant, and terminal and pendant hydroxyl groups and which, optionally, has a plurality of carbamate groups of Structure I selected from the group consisting of terminal and pendant carbamate groups and mixtures thereof, and mixtures of these polymers;
(iii) a polymeric material selected from the group consisting of urethane oligomers having groups selected from carbamate group of Structure I that are pendant, terminal, and pendant and terminal, and an acrylic polymer containing a plurality of amide groups and, optionally, a plurality of terminal, pendant, or terminal and pendant carbamate groups of Structure I and mixtures thereof and
(B) an aminoplast crosslinking agent containing methylol groups, methylol ether groups, or mixtures thereof.

26. The film-forming composition of claim 25 which in addition to the acrylic polymer containing a plurality of amide groups and, optionally, a plurality of terminal, pendant, or terminal and pendant carbamate groups of Structure I and mixtures thereof includes hydrophilically modified silica.

27. The film-forming composition of claim 25 wherein the polyester present in the clear film-forming composition in amounts up to about 60 percent by weight based on the total weight of resin solids in the clear film-forming composition is derived from a cycloaliphatic acid or anhydride.

28. A multi-component coating composition comprising the following components:
(I) a pigmented film-forming composition and, as a separate component,
(II) a clear film-forming composition wherein the clear film-forming composition is a flexible, curable film-forming composition comprising:

(Ai) a polyether polymer containing a plurality of carbamate groups selected from the group consisting of terminal, pendant, and terminal and pendant of the structure:

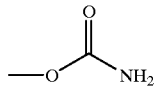

(Structure I)

present in the film-forming composition in amounts of about 5 to about 40 percent by weight based on the total weight of resin solids in the clear film-forming composition, where said polyether polymer has on average up to two of said terminal and/or pendant carbamate groups per molecule and has an equivalent weight of from about 140 to about 2500 based on equivalents of said terminal and pendant carbamate groups;

(Aii) at least one of the polymeric materials selected from the group consisting of:
(1) polyurethane polyol having a plurality of hydroxyl groups selected from terminal, pendant, and terminal and pendant hydroxyl groups and which optionally has a plurality of carbamate groups of Structure I selected from the group consisting of terminal, pendant, and terminal and pendant carbamate groups; and optionally with urethane oligomers having carbamate groups of Structure I selected from the group consisting of pendant, terminal, and pendant and terminal groups;
(2) at least one polymer of polyester polymer, polyurethane polymer, and acrylic polymer, each of these polymers, when present, contains a plurality of carbamate groups of Structure I selected from their group consisting of terminal carbamate groups, pendant carbamate groups, and terminal and pendant carbamate groups, with urethane oligomers having carbamate groups of Structure I selected from the group consisting of pendant, terminal, and pendant and terminal groups; and
(3) any mixtures thereof from (Aii)(1) and (Aii)(2), and
wherein when the polyester is present in the clear film-forming composition the polyester is present in amounts up to about 60 percent by weight based on the total weight of resin solids in the clear film-forming composition, and wherein when the acrylic polymer is present in the clear film-forming composition the acrylic is present in amounts up to about 20 percent by weight based on the total weight of resin solids in the clear film-forming composition, and wherein when the polyurethane or polyurethane polyol is present it is present in amounts up to about 55 percent by weight based on the total weight of resin solids in the clear film-forming composition; and (B) an aminoplast crosslinking agent containing methylol groups, methylol ether groups, or mixtures thereof as a condensate of melamine with formaldehyde and, optionally, an alcohol containing from 1 to 6 carbon atoms and which is present in amounts of about 15 to about 50 percent based on the total weight of resin solids in the clear film-forming composition wherein in flexible, curable film-forming composition for the transparent coat the equivalent ratio of carbamate groups to methylol or methylol ether groups is from about 0.5 to 2:1 and is sufficient to form a crosslinked film.

29. The multi-component coating composition of claim 28 wherein the urethane oligomer is derived from an isocyanate and is present in the clear film-forming composition in amounts up to about 55 percent by weight based on the total weight of resin solids in the clear film-forming composition.

30. The multi-component coating composition of claim 29 wherein said urethane oligomer is the reaction product of hydroxypropyl carbamate and isophorone diisocyanate.

31. The multi-component coating composition of claim 28 wherein said polyurethane has a number average molecular weight of from about 300 to about 3100 as determined by gel permeation chromatography using a polystyrene standard.

32. The multi-component coating composition of claim 28 wherein said polyurethane polyol contains a plurality of terminal hydroxyl groups.

33. The multi-component coating composition of claim 31 wherein said polyurethane polyol is reaction product of butyl ethyl propane diol and an isocyanurate of hexamethylene diisocyanate.

34. The multi-component coating composition of claim 28 wherein said polyurethane contains a plurality of terminal carbamate groups of the structure:

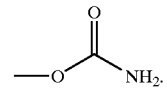

35. The multi-component coating composition of claim 28 which includes an acrylic polymer containing a plurality of amide groups and, optionally, a plurality of terminal, pendant, or terminal and pendant carbamate groups of Structure I and mixtures thereof.

36. The multi-component coating composition of claim 35 wherein the acrylic polymer containing a plurality of amide groups is present in the clear film-forming composition in amounts up to about 30 percent by weight based on the total weight of resin solids in the clear film-forming composition.

37. The multi-component coating composition of claim 35 wherein the clear film-forming composition further comprises a hydrophilically modified silica.

38. The multi-component coating composition of claim 37 wherein the hydrophilically modified silica is an amorphous fumed silica present in the clear film-forming composition in amounts of about 1 to about 2 percent by weight based on the total weight of resin solids in the clear film-forming composition.

39. The multi-component coating composition of claim 28 wherein said composition is suitable for application over a plastic substrate comprising a flexible thermosetting or thermoplastic material.

40. A flexible, curable film-forming composition comprising:
(i) a polyether polymer containing a plurality of terminal, pendant or terminal and pendant carbamate groups of the structure:

Structure I

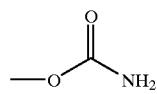

present in the film-forming composition in amounts of 5 to 40 percent by weight based on the total weight of resin solids in the film-forming composition;

(ii) a polymer selected from the group consisting of a polyester polymer, a polyurethane polymer, an acrylic polymer and mixtures thereof wherein each polymer contains a plurality of terminal, pendant or terminal and pendant carbamate groups of Structure I;

(iii) acrylic polymer containing a plurality of amide groups and optionally a plurality of terminal, pendant, or terminal and pendant carbamate groups of Structure I; and (iv) an aminoplast crosslinking agent containing methylol groups, methylol ether groups, or mixtures thereof.

41. A flexible, curable film-forming composition of claim 40 which includes hydrophilically modified colloidal silica present in the film-forming composition in amounts of about 1 to about 2 percent by weight based on the total weight of resin solids in the film-forming composition.

42. A flexible, curable film-forming composition comprising:

A) polyether polymer containing a plurality of carbamate groups of the structure:

Structure I

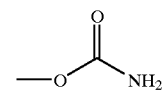

selected from the group consisting of terminal, pendant, and terminal and pendant present in the film-forming composition in amounts of 5 to 40 percent by weight based on the total weight of resin solids in the film-forming composition;

(B) polyester polymer derived from a cycloaliphatic acid or anhydride selected from the group consisting of hexahydrophthalic acid, hexahydrophthalic anhydride, methylhexahydrophthalic acid and methylhexahydrophthalic anhydride, wherein the polyester polymer has a plurality of carbamate groups of Structure I selected from the group consisting of terminal carbamate groups, pendant carbamate groups, and terminal and pendant carbamate groups, and (C) urethane oligomers having carbamate groups of Structure I selected from the group consisting of pendant, terminal, and pendant and terminal groups; and (D) an crosslinking agent consisting essentially of aminoplast containing methylol groups, methylol ether groups, or mixtures thereof selected from the group consisting of: 1) the reaction product of formaldehyde, acetaldehyde, crotonaldehyde and benzaldehyde with an amine, amide, carbamate, urea or benzoguanamine; and 2) aldehyde condensates of glycoluril.

* * * * *